United States Patent Office 3,381,685
Patented May 7, 1968

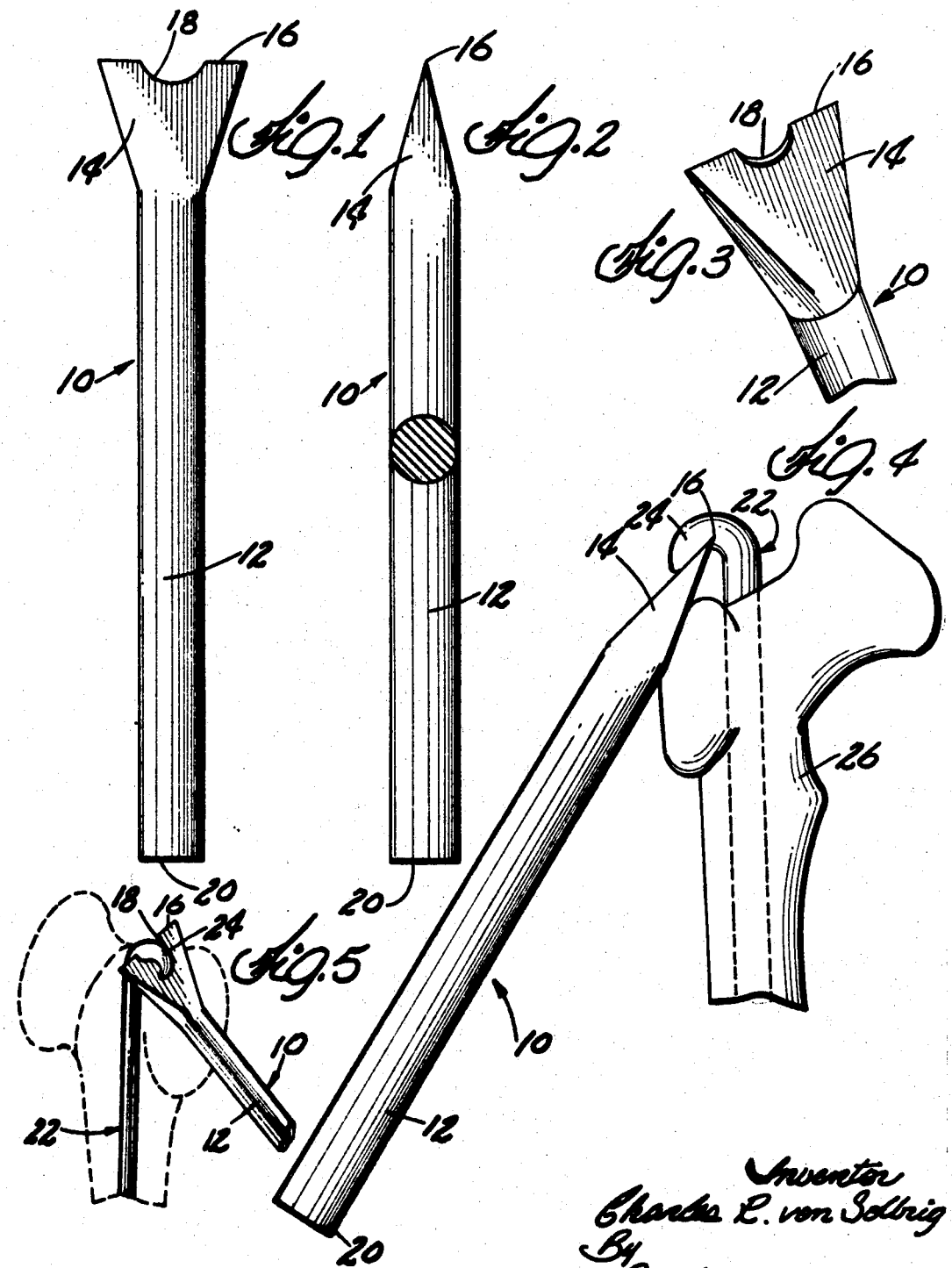

3,381,685
PROCESS OF EXTRACTING AN INTRA-
MEDULLARY ROD FROM A BONE
Charles R. von Solbrig, 6400 S. Keeler Ave.,
Chicago, Ill. 60629
Continuation of application Ser. No. 430,657, Feb. 5,
1965. This application July 10, 1967, Ser. No. 652,370
1 Claim. (Cl. 128—92)

ABSTRACT OF THE DISCLOSURE

A process for extracting an intramedullary rod from a bone with an extractor having a substantially smooth elongate shank portion, a head portion having a tapered configuration forming a transverse narrow edge with the edge having a cut-out therein; wherein the head portion of the extractor is wedgedly placed between the bone and the rod and an axial force is applied thereto to remove the rod from the bone.

This application is a continuation of Ser. No. 430,657 filed Feb. 5, 1965 now abandoned.

This invention relates generally to internal fixation and stabilization of fractured bones, and more particularly, to improved means for extracting intramedullary rods from bone.

An intramedullary rod is an elongate, round or diamond-shaped stainless steel rod of varying lengths, which is applied longitudinally to fractured long bones such as the humerus, femur, tibia and radius in order to accomplish fixation and stabilization of these bones. The rod is introduced into the highly vascular, soft tissue, called the marrow or medulla, that fills the cavities of bones; and is retained therein until healing of the bone has been effected. Subsequently, the rod is removed by an extraction method; but heretofore the devices used for extraction have been cumbersome and difficult to use, and often unduly prolonged the extraction procedure.

Accordingly, it is an object of this invention to provide an improved means for extracting intramedullary rods from bone.

It is another object of this invention to provide an extractor for removing an intramedullary rod from bone quickly, easily, and without causing injury to the bone.

It is a further object of this invention to provide an extractor which can be used in conjunction with the intramedullary rods currently known and employed by orthopedic surgeons and in accordance with generally accepted orthopedic surgical techniques.

It is still a further object of this invention to provide an extractor for removing intramedullary rods from bone which can be simply and economically manufactured.

Further and additional objects will become manifest from the drawing, description, and appended claim.

One form of this invention comprises an elongated shank and a generally V-shaped, tapered head or wedge portion attached to the shank. The wedge portion has a narrow edge which is adapted to be introduced between the head or exposed end of an intramedullary rod and the bone in which the rod is inserted. The other end of the shank is provided with a relatively flat surface which is adapted to receive blows from a surgical hammer. An intramedullary rod is removed with the extractor by inserting the wedge portion of the extractor between the head of the rod and the bone and striking the opposite end of the extractor with a hammer or like instrument. The axial force applied to the extractor will exert pressure on the head of the rod and force the rod out of the bone.

For a more complete understanding of this invention, a drawing has been provided wherein:

FIGURE 1 is a front elevational view of one embodiment of this invention;

FIG. 2 is a side elevational view of the embodiment of FIG. 1, and includes a revolved cross-sectional view;

FIG. 3 is a perspective view of the top portion of the embodiment of FIG. 1;

FIG. 4 is a side elevational view of the embodiment of FIG. 1 showing it in engagement with the head of an intramedullary rod inserted in a bone; and FIG. 5 is a perspective view of the top portion of the embodiment of FIG. 1 shown in engagement with an intramedullary rod inserted in a bone.

Referring now to the drawing, and particularly to FIGS. 1 to 3, an extractor 10 is provided having an elongate, solid, cylindrical shank 12 and a generally V-shaped tapered head or wedge portion 14 attached to one end of the shank. The head 14 is tapered to a narrow edge 16 which allows it to be inserted between the head or exposed portion of an intramedullary rod and the bone in which the rod is inserted. The head 14 has a cut-out portion 18 which provides a seat for the rod when the extractor is in engagement therewith. The lower end 20 of the shank 12 is provided with a flat surface disposed in a plane normal to the longitudinal axis of the shank 12. This surface is particularly adapted to be struck with a surgical hammer, and thus permits an axial force to be readily applied to the extractor.

FIGS. 4 and 5 illustrate the manner in which the extractor 10 is employed to remove an intramedullary rod from bone. As will be seen from FIG. 4, the extractor 10 is brought into engagement with a rod 22 by wedging the edge 16 between the head 24 of the rod and the bone 26. The extractor 10 is then manipulated so that the cut-out portion 18 engages the head 24 of the rod 22 (see FIG. 5). After the extractor 10 and rod 22 are aligned, an axial force is applied to the extractor by tapping the bottom 20 thereof with a hammer or similar instrument. This causes the extractor to exert pressure against the underside of head 24 and force the rod 22 upward and out of the medulla of the bone 26. Because the head of the rod rests in the cut-out portion 18, the rod will not slip out of engagement with the extractor 10 during the extraction process. It is desirable that the shank 12 of the extractor be smooth so that if, during the extraction process, the shank contacts the cortex of the bone, it will slide freely thereover and will not impede movement of the extractor 10.

The extractor is preferably constructed from high quality stainless steel, but may be constructed of any other suitable material which will afford the requisite rigidity and be sufficiently inert with respect to the body fluids and tissues so that it will not be likely to cause infection or other injury to the patient. The size and shape of the extractor 10 may be varied for use in conjunction with different sized intramedullary rods and with the various types of bones.

While a specific embodiment of the invention is described above, it will be understood that the invention is not to be limited thereto since many modifications may be made; and it is contemplated, therefore, by the appended claim to cover any such modifications as fall within the true spirit and scope of this invention.

What is claimed is:

1. A process for extracting an intramedullary rod from a bone with an extractor comprising a substantially smooth elongate shank portion, a head portion at one end of said shank portion having an inverted V-shaped tapered configuration forming a transverse narrow edge, said narrow edge having a cut-out portion therein intermediate the sides thereof; said process comprising: placing the tapered head in contact with the bone in close proximity to the upper portion of the rod to be removed, wedgedly inserting the narrow edge of the extractor in a first position so that the narrow edge contacts the bone and the upper portion of the rod, placing the extractor in a second position so that the cut-out portion in said narrow edge frictionally engages the upper portion of the rod, and applying an axial force to the end of the extractor opposite the head portion sufficient to remove the rod from the bone.

References Cited

UNITED STATES PATENTS

| Re. 12,458 | 2/1906 | Baggett | 145—21 |
| 138,177 | 4/1873 | Mills | 145—21 |
| 584,189 | 6/1897 | Nelson | 254—19 |
| 2,789,558 | 4/1957 | Rush | 128—83 |

RICHARD A. GAUDET, *Primary Examiner.*

J. W. HINEY, *Assistant Examiner.*